United States Patent
Babcock

(10) Patent No.: US 9,516,873 B2
(45) Date of Patent: Dec. 13, 2016

(54) EQUIPMENT DESIGNS FOR APPLYING AGRICULTURAL MANAGEMENT MATERIALS

(71) Applicant: Dow Agrosciences LLC, Indianapolis, IN (US)

(72) Inventor: Jonathan M. Babcock, Carmel, IN (US)

(73) Assignee: Dow AgroSciences LLC, Indianapolis, IN (US)

( * ) Notice: Subject to any disclaimer, the term of this patent is extended or adjusted under 35 U.S.C. 154(b) by 65 days.

(21) Appl. No.: 13/803,547

(22) Filed: Mar. 14, 2013

(65) Prior Publication Data

US 2014/0166778 A1    Jun. 19, 2014

Related U.S. Application Data

(60) Provisional application No. 61/739,599, filed on Dec. 19, 2012.

(51) Int. Cl.
| | |
|---|---|
| *A01G 25/09* | (2006.01) |
| *A01M 21/04* | (2006.01) |
| *A01M 7/00* | (2006.01) |
| *A01C 23/00* | (2006.01) |

(52) U.S. Cl.
CPC .......... *A01M 21/043* (2013.01); *A01C 23/003* (2013.01); *A01M 7/0028* (2013.01)

(58) Field of Classification Search
CPC . E01H 10/007; A01M 7/0014; A01M 7/0042; A01M 7/0092; A01M 7/005; A01M 1/245; A01M 7/00; A01M 7/0053; A01M 7/0071; A01G 25/09; A01G 7/06; E01C 19/10; E01C 19/17; E01C 19/20; E01C 19/204; B05B 1/20; B05B 13/04; B05B 13/06
USPC ........................................................ 239/172
See application file for complete search history.

(56) References Cited

U.S. PATENT DOCUMENTS

| | | | | |
|---|---|---|---|---|
| 2,343,303 | A | * | 3/1944 | Kuhiman ...................... 239/673 |
| 2,826,866 | A | * | 3/1958 | Utterback ...................... 47/57.5 |
| 3,042,970 | A | | 7/1962 | Terenzi |
| 3,134,546 | A | * | 5/1964 | Laughlin ................... 239/222.17 |
| 3,220,653 | A | | 11/1965 | Waldrum |
| 3,231,639 | A | | 1/1966 | Mabru |
| 3,478,930 | A | | 11/1969 | Rigby |
| 3,682,395 | A | * | 8/1972 | Van Der Lely et al. ..... 239/666 |

(Continued)

FOREIGN PATENT DOCUMENTS

| | | |
|---|---|---|
| DE | 10251082 A1 | 5/2004 |
| FR | 2437773 A1 | 4/1980 |

(Continued)

OTHER PUBLICATIONS

International Search Report and Written Opinion of the International Searching Authority in Application No. PCT/US2013/076301, dated May 6, 2014, 8 pages.

(Continued)

*Primary Examiner* — Arthur O Hall
*Assistant Examiner* — Adam J Rogers
(74) *Attorney, Agent, or Firm* — Charles W. Arnett; Faegre Baker Daniels LLP

(57) ABSTRACT

An apparatus and method for applying an agricultural management material to targeted area. Exemplary agricultural management materials include viscous materials.

16 Claims, 8 Drawing Sheets

(56) References Cited

U.S. PATENT DOCUMENTS

| | | | |
|---|---|---|---|
| 3,926,131 A * | 12/1975 | Collins | 111/118 |
| 3,968,933 A * | 7/1976 | Waldrum | 239/171 |
| 4,291,492 A * | 9/1981 | Reynolds et al. | 47/12 |
| 4,381,080 A * | 4/1983 | van der Lely et al. | 239/666 |
| 4,528,919 A * | 7/1985 | Harbolt et al. | 111/175 |
| 4,662,565 A | 5/1987 | Waldrum | |
| 4,698,362 A | 10/1987 | Shafer | |
| 4,749,125 A | 6/1988 | Escallon | |
| 5,016,817 A | 5/1991 | Ghate | |
| 5,469,653 A | 11/1995 | Roehrick | |
| 6,237,859 B1 * | 5/2001 | Hill | 239/77 |
| 7,905,054 B1 * | 3/2011 | Metzler | 47/57.5 |
| 2004/0047889 A1 | 3/2004 | Greeson et al. | |
| 2005/0005509 A1 | 1/2005 | Tindall et al. | |
| 2006/0214022 A1 * | 9/2006 | Caccaviello | 239/172 |
| 2010/0044463 A1 * | 2/2010 | Walker et al. | 239/201 |
| 2010/0307413 A1 | 12/2010 | Mitsui | |
| 2011/0139899 A1 * | 6/2011 | Robinson, Jr. | 239/302 |
| 2011/0232177 A1 | 9/2011 | Eastin et al. | |
| 2011/0315788 A1 | 12/2011 | Henderson | |
| 2014/0283442 A1 * | 9/2014 | Thomas et al. | 47/1.5 |

FOREIGN PATENT DOCUMENTS

| | | |
|---|---|---|
| GB | 2251166 A | 7/1992 |
| JP | 2011 042638 A | 3/2011 |
| RU | 2176875 C2 | 12/2001 |
| RU | 2347364 C1 | 2/2009 |
| RU | 91807 U1 | 3/2011 |
| RU | 102513 U1 | 3/2011 |
| WO | WO 2005/015993 A1 | 2/2005 |

OTHER PUBLICATIONS

International Search Report and Written Opinion of the International Searching Authority in Application No. PCT/US2013/076300, dated May 7, 2014, 10 pages.
International Search Report and Written Opinion of the International Searching Authority in Application No. PCT/US2013/076303, dated May 6, 2014, 12 pages.
U.S. Appl. No. 13/803,781, filed Mar. 14, 2013, 36 pages.
U.S. Appl. No. 13/803,970, filed Mar. 14, 2013, 35 pages.
U.S. Appl. No. 13/804,067, filed Mar. 14, 2013, 37 pages.
Splat User's Guide to Mating Disruption and Attract & Kill Formulations Updated Dec. 21, 2011 http://www.iscatech.com/exec/DocLib/ISCA_Product_info_-_SPLAT_Guide.pdf.
The International Search Report and the Written Opinion of the International Searching Authority, or the Declaration—International Application No. PCT/US2013/07630.
Mechanically-applied wax matrix (SPLAT-GBM) for mating disruption of grape berry moth (Lepidoptera; Tortricidae), Teixeira et al., Crop Protection 29 (2010) pp. 1514-1520.
European Search Report, EPO/Munich, EP 13865289.6, May 17, 2016.
YouTube Video "ATV Video 1" SPLAT-o-Gator applying SPLAT GBM, link: https://www.youtube.com/watch?v=PUEJ8TMPWKM, Uploaded by ISCA Tech on Dec. 17, 2008. (runtime 2mins 2secs).
YouTube Video "Grease Gun Video" SPLAT application using 12v electric grease gun, link: https://www.youtube.com/watch?v=45Wh5J1VT1M, Uploaded by ISCA Tech on Jan. 21, 2009. (runtime 35 seconds).
YouTube Video "Metered Gun Video" SPLAT application using M10 Metered Gun, link: https://www.youtube.com/watch?v=3UXIKey0T4, Uploaded by ISCA Tech on Mar. 9, 2009. (1min 40secs).
YouTube Video "Air Gun Video" SPLAT Grease Gun Demonstration, link: https://www.youtube.com/watch?v=BIrKj-hAXqc, Uploaded by ISCA Tech on May 15, 2009. (runtime 1min 57secs).
YouTube Video "ATV Video 2" SPLAT Wizard application in Watsonville, CA, link: https://www.youtube.com/watch?v=rTxwuY3nC2U, Uploaded by ISCA Tech on Nov. 10, 2009. (runtime 2mins 59secs).
YouTube Video "Motorcycle Video" Aplicador SPLAT—Soprador Grande, link: http://www.youtube.com/watch?v=1GgCzWoIPUA, Uploaded by Leandro Mafra on Oct. 3, 2011. (runtime 1min).
ISCA SPLAT webpage, Link: http://www.iscatech.com/exec/SPLAT.html, accessed Aug. 2015.

* cited by examiner

EQUIPMENT DESIGNS FOR APPLYING AGRICULTURAL MANAGEMENT MATERIALS

RELATED APPLICATIONS

This application claims the benefit of U.S. Provisional Patent Application Ser. No. 61/739,599, filed Dec. 19, 2012, titled EQUIPMENT DESIGNS FOR APPLYING AGRICULTURAL MANAGEMENT MATERIALS, the disclosure of which is expressly incorporated by reference herein.

This application is related to U.S. Provisional Patent Application Ser. No. 61/739,605, filed Dec. 19, 2012, titled APPLICATION DEVICE DESIGNS FOR APPLYING AGRICULTURAL MANAGEMENT MATERIALS TO TARGETED SUBSTRATES; U.S. Provisional Patent Application Ser. No. 61/739,589, filed Dec. 19, 2012, titled AUTOMATED DEVICE FOR THE APPLICATION OF AGRICULTURAL MANAGEMENT MATERIALS; and U.S. Provisional Patent Application Ser. No. 61/739,581, filed Dec. 19, 2012, titled MECHANICAL APPLICATOR FOR AGRICULTURAL MANAGEMENT MATERIALS, the disclosures of which are expressly incorporated by reference herein.

FIELD

The present invention relates to methods and apparatus for delivering an agricultural management material and in particular to methods and apparatus for delivering a viscous pest control material to targeted substrates including one or more of agricultural crops, plants, structures, and substrates in the proximity thereof.

BACKGROUND

Agricultural management materials, such as viscous materials are used as specialized substrates for delivering pheromones and insecticides into agricultural settings such as orchards, groves, plantations, vineyards, or onto surrounding areas with the purpose of effecting pest control or management in the agricultural area. Traditional pest control and pest management materials are often diluted with water and sprayed under pressure on to the crops or other plant substrate. However, this is not an option for more viscous materials, materials that are not miscible in water, or materials that are intended to remain as discrete, localized deposits on the target substrate. Methods and apparatus for applying highly viscous materials, such as for pest control and pest management, that results in the controlled deposition of discrete or localized material on the target plant are desired.

SUMMARY

In an exemplary embodiment of the present disclosure, an applicator system for applying a material to a targeted area is provided. The applicator system may apply a viscous material to the targeted area.

In one exemplary embodiment, an applicator system for applying a viscous agricultural management material to a targeted area is provided. The applicator system includes a frame configured to be attached to a vehicle; a reservoir providing the viscous agricultural management material; and a pump for supplying the viscous agricultural management material to at least one wand; wherein the at least one wand is configured to collect a quantity of the viscous agricultural management material on a collection area and deposit the quantity of viscous agricultural management material to the targeted area.

In another exemplary embodiment, a method of applying a viscous agricultural management material to a targeted area is provided. The method includes providing a viscous agricultural management material to at least one wand, the wand being attached to a frame configured to be attached to a vehicle; collecting a quantity of the viscous agricultural management on a collection area of the at least one wands; and depositing the quantity of the viscous agricultural management material on the targeted area.

The above mentioned and other features of the invention, and the manner of attaining them, will become more apparent and the invention itself will be better understood by reference to the following description of embodiments of the invention taken in conjunction with the accompanying drawings.

BRIEF DESCRIPTION OF THE DRAWINGS

FIG. 4A illustrates an enlarged portion of the material delivery system of FIG. 4;

DETAILED DESCRIPTION OF THE DRAWINGS

The embodiments disclosed below are not intended to be exhaustive or to limit the invention to the precise forms disclosed in the following detailed description. Rather, the embodiments are chosen and described so that others skilled in the art may utilize their teachings. While the present disclosure is primarily directed to the application of viscous materials onto agricultural or other plant substrates, it should be understood that the features disclosed herein may also have application to the application and delivery of other materials to other targets.

Figure 1A:
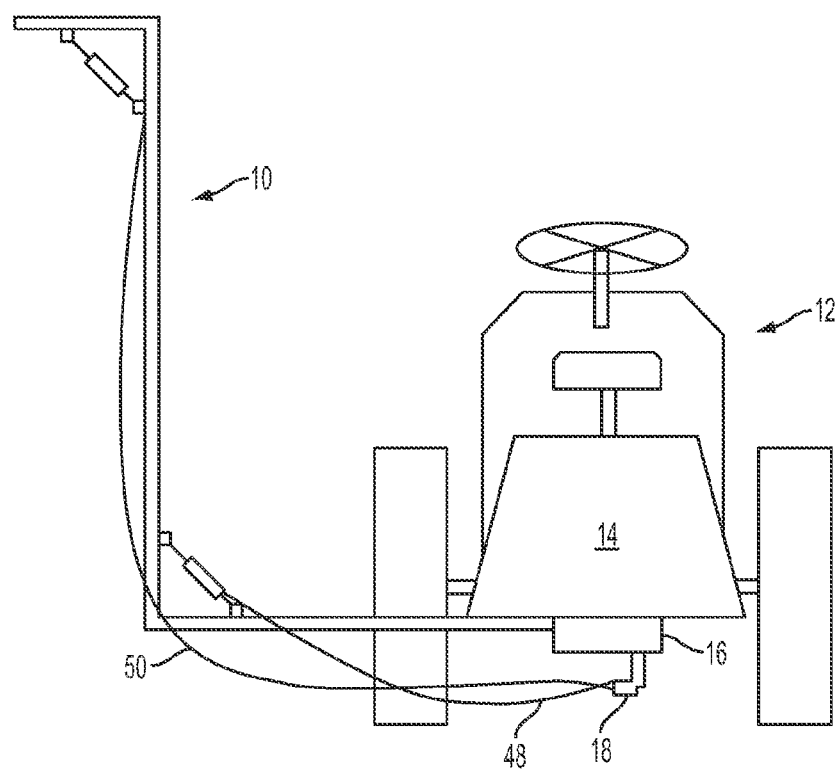
FIGS. 1A and 1B illustrates a vehicle having a pumping system that may be used with an exemplary embodiment of the present disclosure.
Figure 1B:
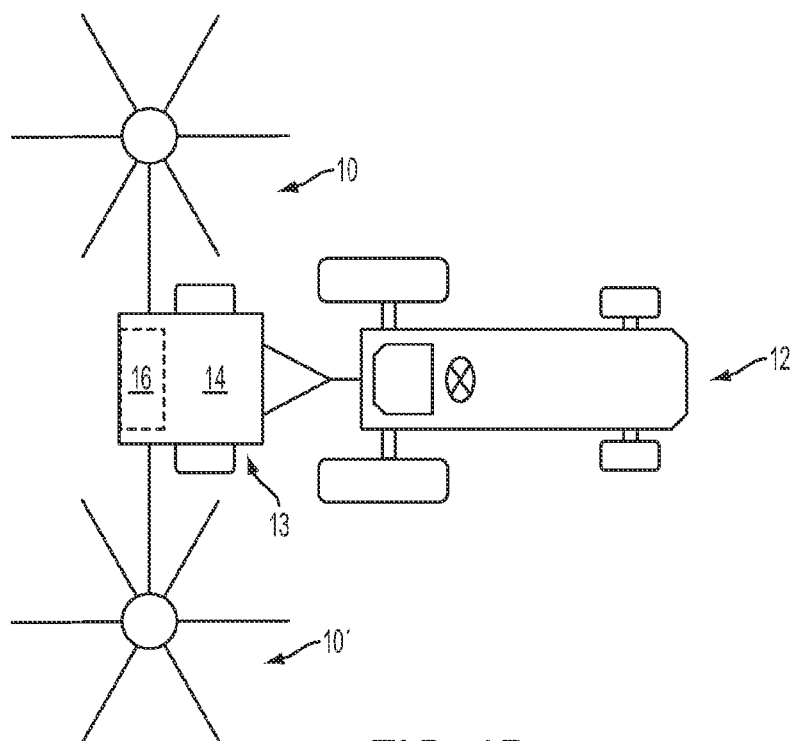

Referring first to FIGS. 1A and 1B, an exemplary viscous material applicator system 10 is illustrated attached to a vehicle 12. Applicator system 10 applies an agricultural management material, such as a viscous material onto a targeted substrate. Exemplary agricultural management materials include pesticides, insecticides, pheromones, or other suitable viscous materials, onto a target. Suitable target substrates include trees, leaves, vines, stalks, and other suitable vegetation and plant substrates. Additional suitable target substrates include non-plant material in the area near the plant or crop, such as fence posts or other structures surrounding a field, orchard, plantation, or grove. In some embodiments, the applicator system reduces the amount of viscous material ending up in off-target locations like the ground, making a more efficient use of the viscous material.

In one embodiment, the present disclosure is directed to applying viscous agricultural management materials. Viscosity is a measure of the resistance of a fluid being deformed by either shear or tensile stress. Fluids with higher viscosity are observed as having a greater "thickness" or "internal friction," while fluids with lower viscosity are observed as having a greater ease of movement or fluidity. In one embodiment, viscous materials include materials having a viscosity as low as about 1,000 cP, 2,000 cP, or 2,200 cP or as high as about 63,000 cP, 65,000, or 75,000 cP, or within any range defined by between any pair of the foregoing values. Exemplary methods of measuring viscosity include using a Brookfield DVI viscometer, available from Brookfield Engineering Laboratories, Inc., Middleboro, Mass. Exemplary test conditions include measuring the viscosity at 21° C. using a Brookfield DVI viscometer with a #6 or #7 spindle and a spindle speed of 100 rpm.

Vehicle 12 moves applicator system 10 relative to the target. In the illustrated embodiment, vehicle 12 is a tractor. In other embodiments, other suitable vehicles, such as utility and all-terrain vehicles, are used as vehicle 12. In one embodiment, vehicle 12 includes a power source for providing electrical or mechanical power to applicator system 10. Exemplary power sources include a power-take-off (PTO), hydraulic power, electric power, and other suitable power sources. In another embodiment, vehicle 12 does not include a power-take-off.

In one exemplary embodiment, illustrated in FIG. 1B, applicator system 10 may be attached to trailer 13 towed behind vehicle 12. In another exemplary embodiment, illustrated in FIG. 2, applicator system 10 is directly attached to vehicle 12 through a hitch 15. Exemplary hitches include three-point hitches. In the exemplary embodiment illustrated in FIG. 2, applicator system 10 is attached to a rear of vehicle 12. In another embodiment, applicator system 10 is attached to a front or side of vehicle 12. Applicator system 10 is illustrated positioned on a left side of vehicle 12 in FIGS. 1A, and 2. In other embodiments, applicator system 10 is positioned on a right, front, or back side of vehicle 12. In one embodiment, applicator system 10 is removably mounted on the right of vehicle 12 in a first configuration and removably mounted on the left side of vehicle 12 in a second configuration. In still another embodiment, as illustrated in FIG. 1B, a first applicator system 10 is mounted on a left side of vehicle 12 and a second applicator system 10' similar to first applicator system 10 is mounted on a right side of vehicle 12. In yet still another embodiment, more than two applicators may be mounted to a vehicle.

The viscous material to be applied is provided in a reservoir 14 attached to vehicle 12. A pump 16 pressurizes the viscous material and provides it to applicator system 10 through connection 18. In one embodiment, pump 16 is powered from the power-take-off or other power source provided by vehicle 12. In another embodiment, pump 16 is powered by a separate generator or other power source (not shown). In one embodiment, the pump 16 re-circulates the viscous material when it is not being applied. In one embodiment, the pump 16, reservoir 14, or both are maintained at a desired viscosity by heating, cooling, or both heating and cooling the material for application under a range of ambient temperatures.

Figure 2:
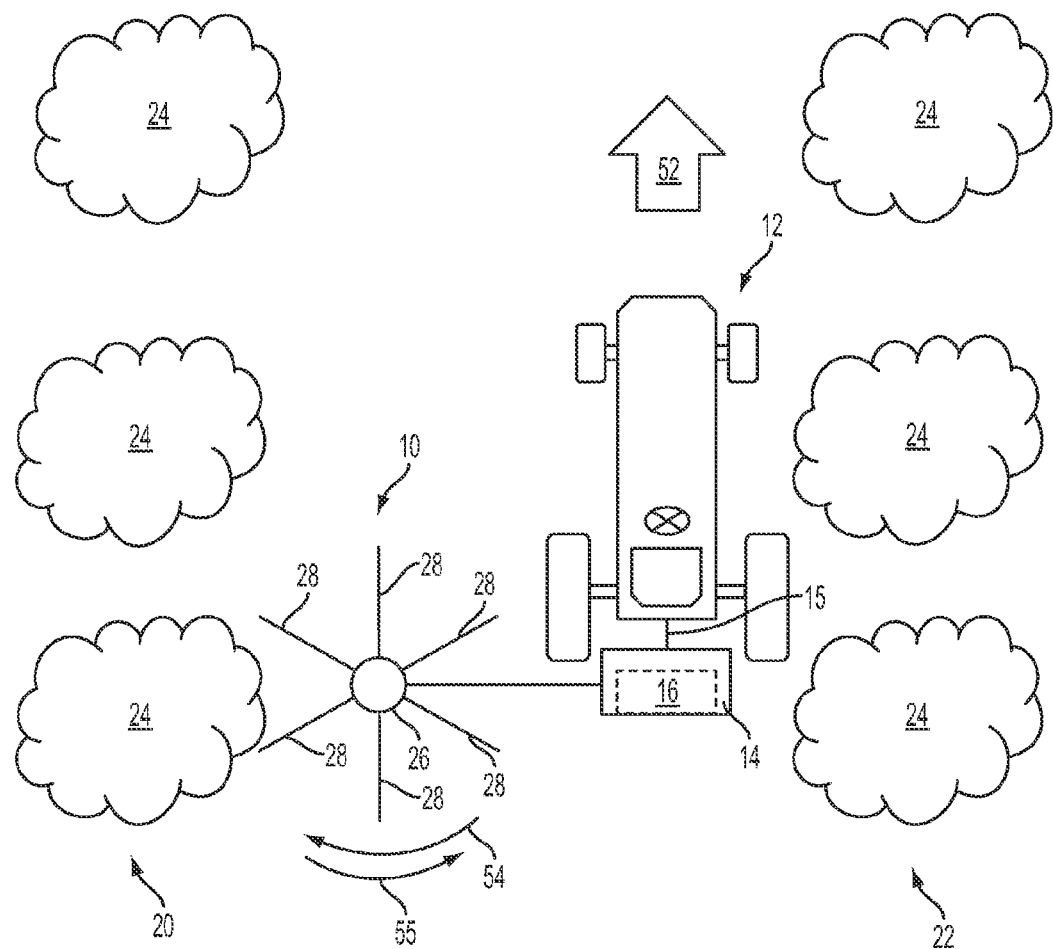
FIG. 2 illustrates the vehicle of FIG. 1A in combination with a viscous material delivery system according to the present disclosure applying a pest control to a target row of trees.

Referring next to FIG. 2, as vehicle 12 transports applicator system 10 between rows 20, 22 of trees 24 or other targets to which the viscous material is to be applied, applicator system 10 contacts the target trees to apply the viscous material. In another exemplary embodiment, vehicle 12 transports applicator system 10 and applicator system 10' (see FIG. 1B) between rows 20, 22 of trees 24 or other targets and applicator system 10 contacts trees in row 20 and applicator system 10' contacts trees in row 22.

Figure 3A:
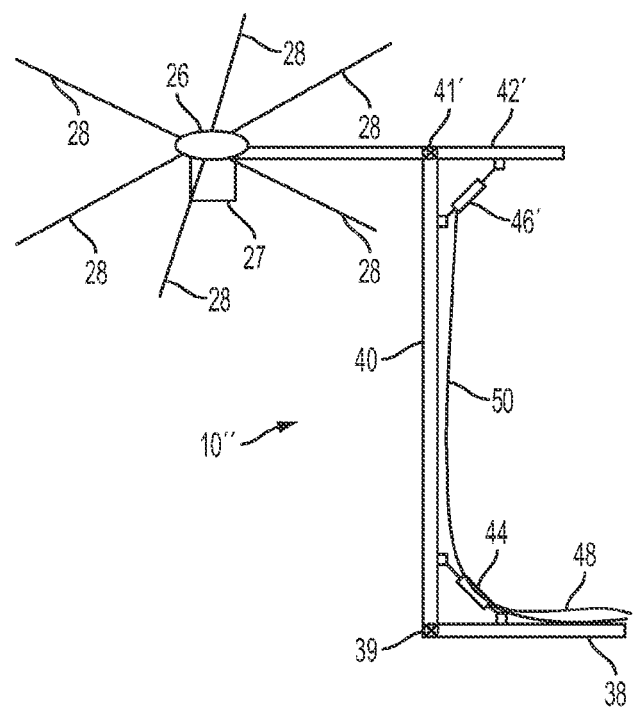
FIG. 3A illustrates another exemplary viscous material delivery system.
Figure 3:
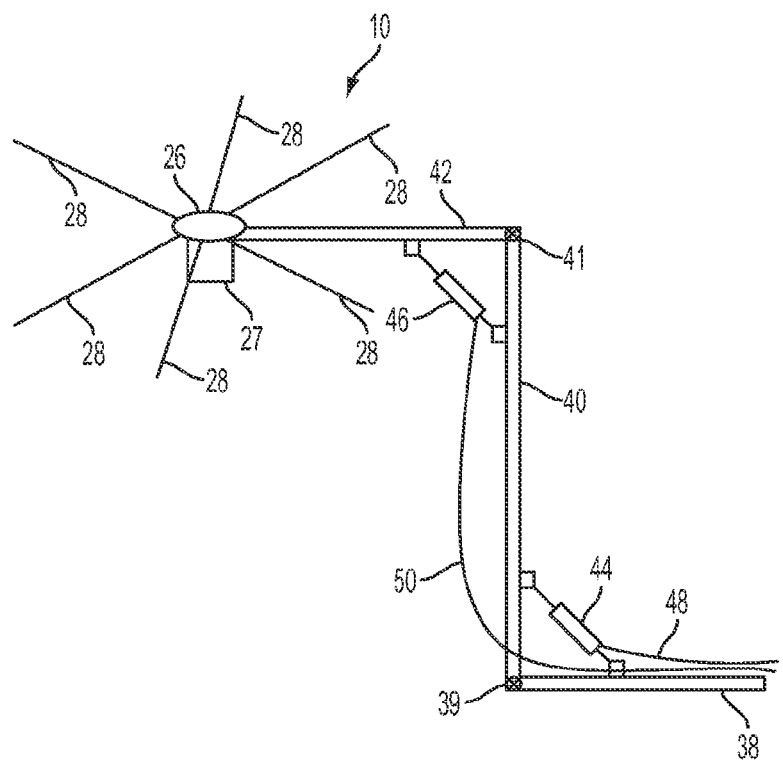
FIG. 3 illustrates the viscous material delivery system of FIG. 2.

As illustrated in FIGS. 2 and 3, applicator system 10 includes a plurality of wands 28 attached to a rotating disc 26. In one embodiment, wands 28 are hollow (see FIG. 5), and the viscous material is emitted from an open tip of the hollow wand 28 onto trees 24. In one exemplary embodiment, the wands 28 are formed from a flexible material.

In one exemplary embodiment, a plurality of interchangeable wands 28 is provided. In one embodiment, the plurality of interchangeable wands 28 includes wands configured for use with different viscosity materials. In another embodiment, the plurality of interchangeable wands 28 includes wands to provide different rates of deposition or deposit size. The wands 28 attached to applicator system 10 are interchangeable with the plurality of wands for use with various materials or various viscosities, or to provide various rates or sizes of material deposition.

Figure 4:
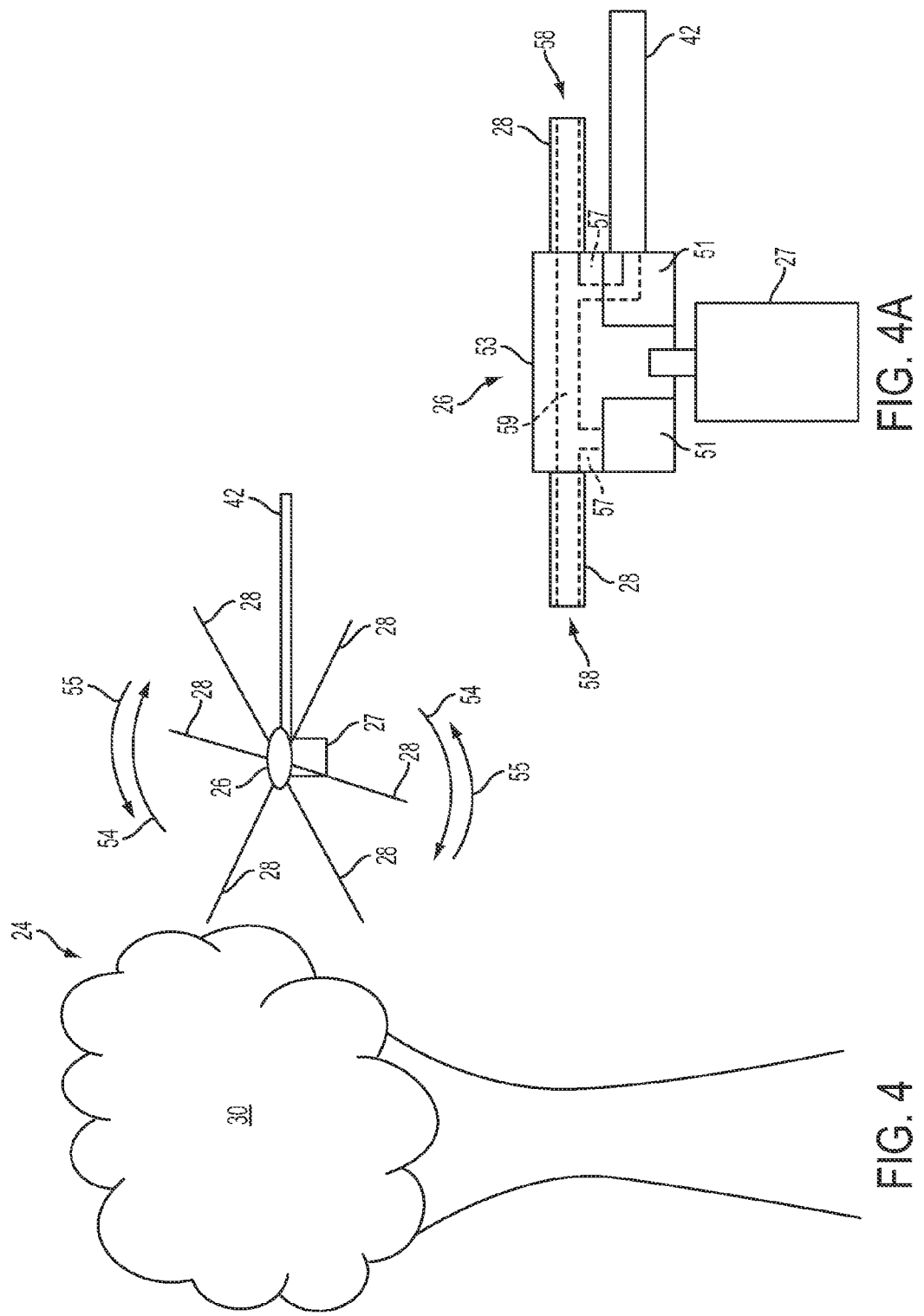
FIG. 4 illustrates the viscous material delivery system of FIG. 3 applying a pest control material to a tree canopy.

As illustrated in FIGS. 2 and 4, as vehicle 12 moves applicator system 10 in direction 52, motor 27 rotates disc 26 and wands 28. As illustrated in FIGS. 2 and 4, applicator system 10 includes six wands 28. In other embodiments, applicator system 10 may include more or fewer wands 28. In one exemplary embodiment, motor 27 is a pneumatically powered motor powered by compressed air provided from a compressor attached to the power-take-off from vehicle 12. Other exemplary motors 27 include electric and hydraulic driven motors powered by the power-take-off from vehicle 12 or other suitable power source. In another exemplary embodiment, applicator system 10 does not include a motor 27 and wands 28 are freely rotated about rotating disc 26 through contact with the target, such as trees 24. In still another exemplary embodiment, applicator system 10 does not include a motor 27 and wands 28 are rotated about rotating disc 26 through contact with the target while resistance is applied to the disc to control the speed of rotation of the disc.

In one exemplary embodiment illustrated in FIGS. 2 and 4, motor 27 rotates disc 26 and hollow wands 28 in a first direction 54 when vehicle 12 is traveling in direction 52. In another exemplary embodiment, motor 27 rotates disc 26 and hollow wands 28 in a second direction 55 when traveling in direction 52. In still another exemplary embodiment, when vehicle 12 is traveling in direction 52, motor 27 rotates in first direction 54 when applying the viscous material to targeted trees 24 in a row 20 on a first side of the vehicle 12, and motor 27 rotates in a second direction 55 when applying the viscous material to targeted trees 24 in a row 22 on a second side of the vehicle 12.

As illustrated in FIG. 3, in one embodiment applicator system 10 includes a frame comprising a first portion 38 attached to vehicle 12 or trailer 13, a second portion 40 attached to first portion 38, and a third portion 42 connecting the second portion to the disc 26 and motor 27. In one embodiment, first portion 38, second portion 40, and third portion 42 are formed from metal, plastic, or other suitable material. In one exemplary embodiment, first portion 38, second portion 40, and third portion 42, form a hollow fluid pathway to provide the viscous material from reservoir 14 to disc 26, which provides viscous material to the hollow wands 28 for application. In another exemplary embodiment, first portion 38, second portion 40, and third portion 42, are coupled to a fluid pathway between reservoir 14 and disc 26.

In one embodiment, as illustrated in FIGS. 3 and 3A, first portion 38 and second portion 40 are rotatably coupled about pivot 39 and second portion 40 and third portion 42 are rotatably coupled about pivot 41. Adjustment mechanism 44 adjusts the position of first portion 38 and second portion 40 about pivot 39. Adjustment mechanism 46 adjust the angle between second portion 40 and third portion 42 about pivot 41. Exemplary adjust mechanisms 44, 46 include hydraulic screws and electric and pneumatic piston adjustment mechanisms. Control line 48 operably coupled to adjustment mechanism 44 and control line 50 operably coupled to adjustment mechanism 46 allow a control signal from the vehicle 12 to adjust the relative positions of first portion 38, second portion 40, and third portion 42 about pivots 39 and 41. In one exemplary embodiment, control lines 48, 50 are hydraulic, pneumatic, or electrical control lines controlling adjustment mechanisms 44, 46, control lines 48, 50 carrying power, compressed air, or hydraulic fluid provided by pump 12, a power source associated with vehicle 12, or another power source associated with applicator system 10 or trailer 13.

In one exemplary embodiment at least one of first portion 38, second portion 40, and third portion 42 includes at least one length adjustment mechanism not shown) for adjusting the length of one or more of first portion 38, second portion 40, or third portion 42. Exemplary length adjustment mechanisms include telescoping adjustment mechanisms. In one embodiment, the length adjustment mechanism allows applicator system 10 to be more precisely positioned as desired to apply the material to the target. In one embodiment, the at least one length adjustment mechanism includes one or more control lines operably coupled to the at least one length adjustment mechanism receiving a control signal from the vehicle 12 to adjust the length of at least one of first portion 38, second portion 40, and third portion 42. Exemplary control lines include hydraulic, pneumatic, or electrical control lines carrying power, compressed air, or hydraulic fluid provided by pump 12, a power source associated with vehicle 12, or another power source associated with applicator system 10 or trailer 13 to the at least one length adjustment mechanism.

FIG. 3A illustrates a portion of another exemplary applicator system 10". Applicator system 10" is similar to applicator system 10, and the numerals used to refer to applicator system 10 are used to refer to similar components of applicator system 10". Applicator system 10' includes third portion 42' coupled to second portion 40 at a pivot 41' positioned at a point other than the end of third portion 42'. Adjustment mechanism 46', controlled by control line 50, adjusts the relative position of third portion 42' about second portion 40. In the illustrated embodiment, adjustment mechanism 46' is positioned on the opposite side of second portion 40 as disc 26 and wands 28.

As wands 28 rotate, they intercept the targeted plant to apply the viscous material. As illustrated in FIG. 4, in one embodiment, the wands 28 intercept the canopy 30 of trees 24. Adjustment mechanisms 44 and 46 adjust the position of wands 28 to ensure that the ends of the wands 28 apply the viscous material to the target area. As an example, referring to FIG. 2, as vehicle 12 moves in direction 52, adjustment mechanism 44 can be extended to position the disc 26 and wands 28 further from vehicle 12, and adjustment mechanism 44 can be retracted to position the disc 26 and wands 28 closer to vehicle 12. Additionally, adjustment mechanism 44 can be extended to position the disc 26 and wands 28 at a higher position to reach the canopy 30 (see FIG. 4) or other target area, and adjustment mechanism 44 can be retracted to position the disc 26 and wands 28 at a lower position. In one embodiment, adjustment mechanism 44 and adjustment mechanism 46 are extended and retracted together.

Referring next to FIG. 4A, an enlarged view of the exemplary disc 26 and motor 27 of FIG. 4 are illustrated. In the illustrated embodiment, wands 28 have a hollow opening 58 extending from the disc 26 to the distal tip area 56 (see FIG. 5). In the illustrated embodiment, the viscous material is supplied to disc 26 from reservoir 14 through hollow third portion 42. Disc 26 comprises stationary annular portion 51 supported by third portion 42 and a rotating portion 53 rotated by motor 27. The viscous material is supplied into annular portion 51, where it passes into rotating portion 53 through a plurality of ports 57 in rotating portion 53. The ports are connected to the hollow openings 58 of wands 28 through disc channels 59 in rotating portion 53 of disc 26.

Figure 5:
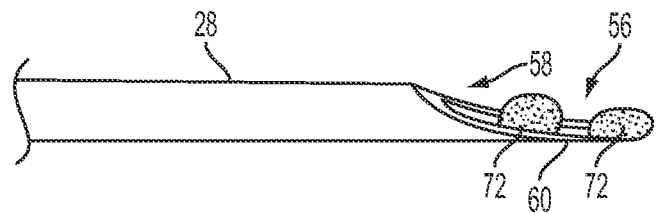
FIG. 5 illustrates a tip of the viscous material delivery system of FIG. 4.

Referring next to FIG. 5, a tip area 56 of hollow wands 28 is illustrated. The viscous material is transmitted through the hollow openings 58 and emitted at the tip area 56 of wand 28 and onto staging area 60, where it is applied to the target area when the tip area 56 of wand 28 contacts the target area. In the illustrated embodiment, a top portion of tip area 56 of hollow wand 28 has been removed to form staging area 60. In other embodiments, the tip area 56 of hollow wand 28 is formed to include substantially flat or open staging area 60. FIG. 5 further illustrates multiple dollops 72 to the viscous material on staging area 60. In other embodiments, viscous material on staging area 60 will form a single mass that is wiped off when the tip area 56 contacts the target area.

Figure 6:
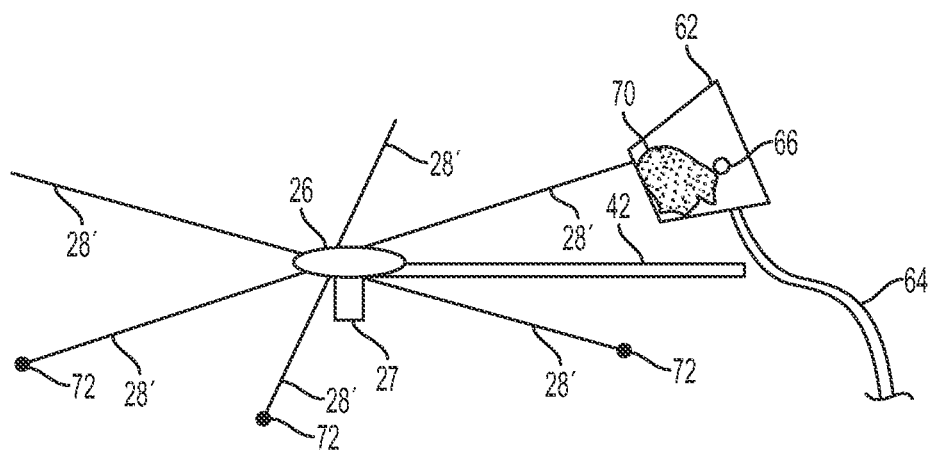
FIG. 6 illustrates another exemplary material delivery system including a plate.

Referring next to FIG. 6, another exemplary embodiment of the applicator system 10 using wands 28' is illustrated. In one exemplary embodiment, wands 28' are similar to hollow wands 28. In another exemplary embodiment, wands 28' are not hollow. The viscous material is emitted from tubing 64 through opening 66 onto stationary plate 62, forming staging quantity 70 of the viscous material. As motor 27 rotates disc 26 and the plurality of wands 28', the tip of each wand 28' contact staging quantity 70 of the viscous material, and picks up a dollop 72 of the material on the end of each wand 28'. The dollop 72 is then wiped off when the wand 28' contacts the target area. Although stationary plate 62 is illustrated at a position opposite the target contact area in FIG. 6, the stationary plate 62 may be positioned at any point in rotation of wand 28'.

Figure 7:
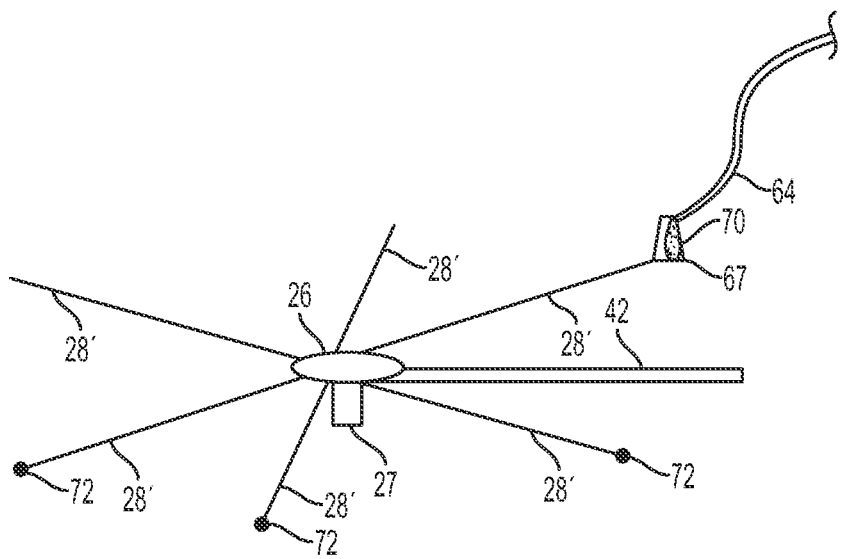
FIG. 7 illustrates still another exemplary material delivery system including a flexible tab.

Referring next to FIG. 7, yet another exemplary embodiment of the applicator system 10 using wands 28' is illustrated. The viscous material is emitted from tubing 64 onto a flexible tab 67, forming staging quantity 70 of the viscous material. As motor 27 rotates disc 26 and the plurality of wands 28', the tip of each wand 28' contact staging quantity 70 of the viscous material, and picks up a dollop 72 of the material on the end of each wand 28'. The dollop 72 is then wiped off when the wand 28' contacts the target area.

Although the flexible tab 67 is illustrated at a position opposite the target contact area in FIG. 6, the flexible tab 67 may be positioned at any point in rotation of wand 28'.

Figure 8:
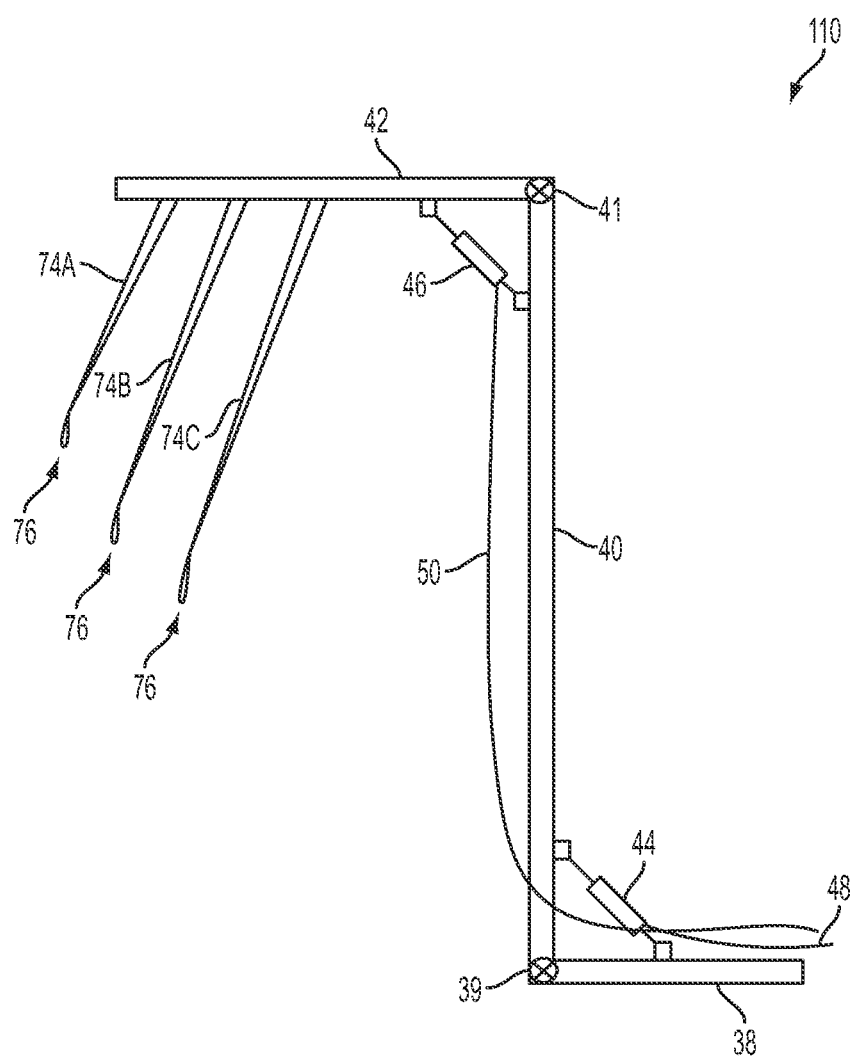
FIG. 8 illustrates another exemplary material delivery system including a plurality of fixed vertical wands.

Referring next to FIG. 8, another exemplary applicator system 110 is illustrated. Applicator system 110 is similar to applicator system 10, and the numerals used to refer to applicator system 10 are used to refer to similar components of applicator system 110. FIG. 8 illustrates an applicator system 110 with hollow vertical wands 74A, 74B, and 74C attached to third portion 42. In one embodiment, third portion 42 includes a manifold (not shown) dividing viscous material received from the reservoir 14 between each of the hollow vertical wands 74A, 74B, and 74C. Illustratively, applicator system 110 includes three hollow vertical wands 74A, 74B, and 74C. In other embodiments, applicator system 110 includes more or fewer hollow vertical wands. In the illustrated embodiment, hollow vertical wands 74A, 74B, and 74C each have different lengths, but in other embodiments, two or more of hollow vertical wands 74A, 74B, and 74C have the same length. Hollow vertical wands 74A, 74B, and 74C emit dollops 76 of material which are then rubbed off or otherwise deposited onto the target. In one exemplary embodiment, hollow vertical wands 74A, 74B, and 74C are formed from a flexible material, such as plastic tubing. Hollow vertical wands 74A, 74B, 74C are fixed to third portion 42 of the applicator system 110 and dragged over the target via motion of the vehicle 12.

Figure 9:
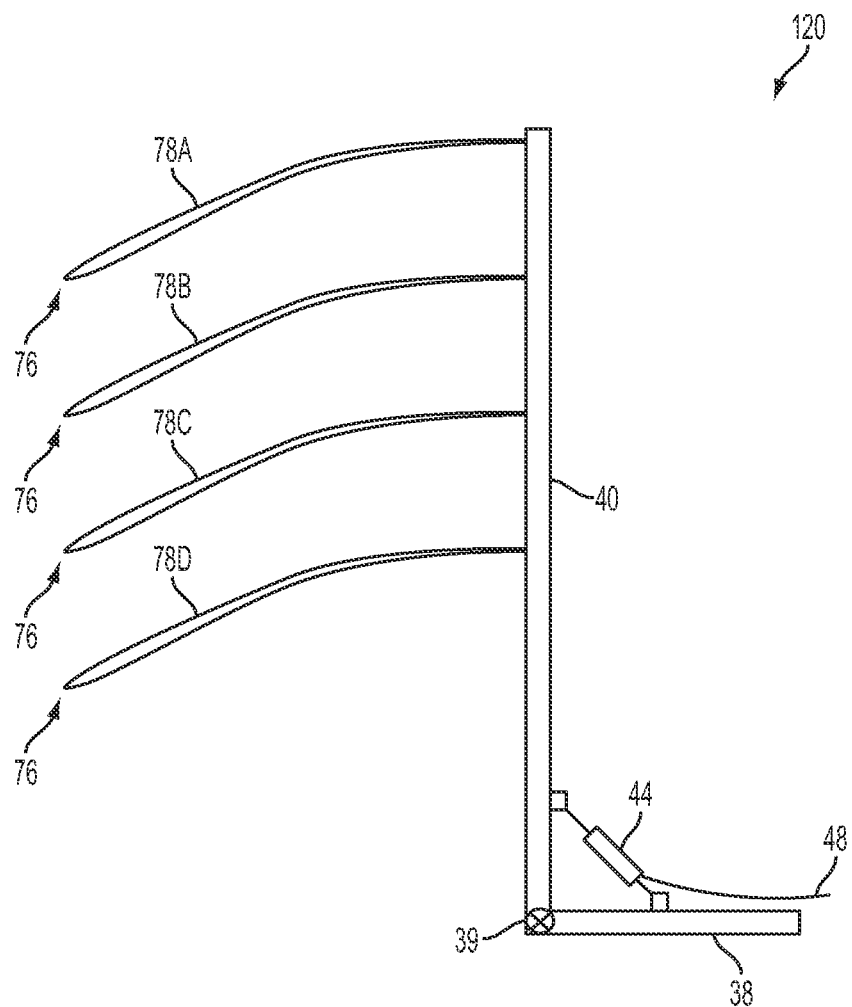
FIG. 9 illustrates still another exemplary material delivery system including a plurality of fixed horizontal wands.

Referring next to FIG. 9, still another exemplary applicator system 120 is illustrated. Applicator system 120 is similar to applicator system 10, and the numerals used to refer to applicator system 10 are used to refer to similar components of applicator system 120. FIG. 9 illustrates an applicator system 120 with hollow horizontal wands 78A, 78B, 78C, and 78D attached to second portion 40. In one embodiment, second portion 40 includes a manifold (not shown) dividing viscous material received from the reservoir 14 between each of the hollow horizontal wands 78A, 78B, 78C, and 78D. Illustratively, applicator system 120 includes four hollow horizontal wands 78A, 78B, 78C, and 78D. In other embodiments, applicator system 120 includes more or fewer hollow horizontal wands. In the illustrated embodiment, hollow horizontal wands 78A, 78B, 78C, and 78D each has the same length, but in other embodiments, two or more of hollow horizontal wands 78A, 78B, 78C, and 78D have different lengths. Hollow horizontal wands 78A, 78B, 78C, and 78D emit dollops 76 of material which are then rubbed off or otherwise deposited onto the target. In one exemplary embodiment, hollow horizontal wands 78A, 78B, 78C, and 78D are formed from a flexible material, such as plastic tubing. Hollow horizontal wands 78A, 78B, 78C, and 78D are fixed to second portion 40 of the applicator system 110 and dragged over the target via motion of the vehicle 12.

Figure 10B:
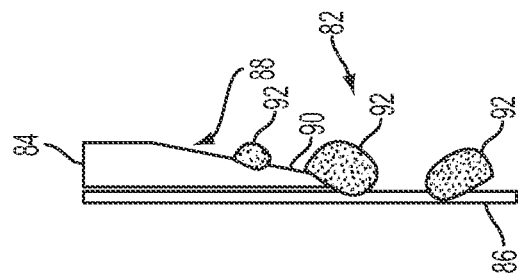
FIG. 10B illustrates a side view of a tip of the exemplary material delivery system of FIG. 10.
Figure 10A:
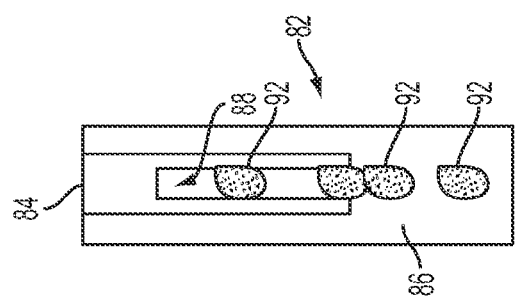
FIG. 10A illustrates a front view of a tip of the exemplary material delivery system of FIG. 10.
Figure 10:
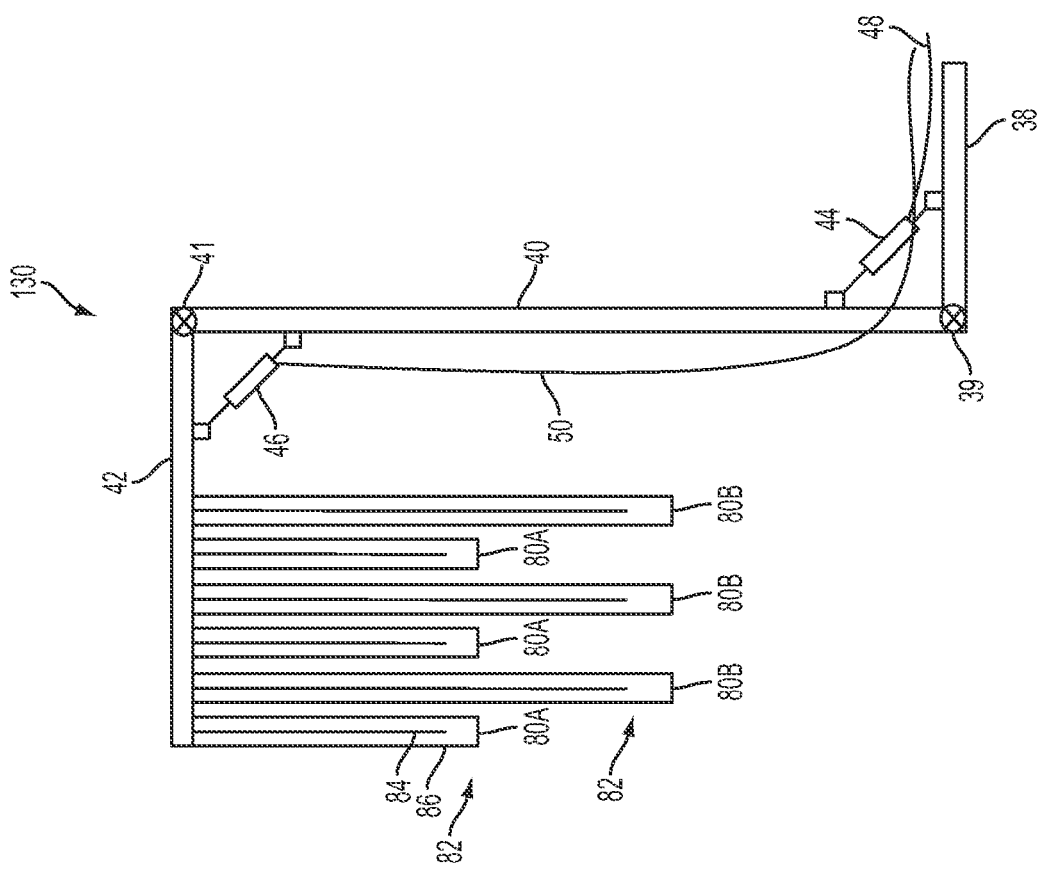
FIG. 10 illustrates yet still another exemplary material delivery system including a plurality of vertical wiper wands.

Referring next to FIG. 10, still another exemplary applicator system 130 is illustrated. Applicator system 130 is similar to applicator system 10, and the numerals used to refer to applicator system 10 are used to refer to similar components of applicator system 130. FIG. 10 illustrates an applicator system 130 with vertical wipers 80A, 80B attached to third portion 42, each vertical wiper 80A, 80B comprising hollow vertical wands 84 attached to a backing 86. In one embodiment, third portion 42 includes a manifold (not shown) dividing viscous material received from the reservoir 14 between each of the hollow vertical wands 84. In the embodiment illustrated in FIG. 10, both short vertical wipers 80A and long vertical wipers 80B are shown, but in other embodiments, the vertical wipers may each be the same length, or more than two sizes of vertical wipers may be included. Illustratively, applicator system 130 includes three short vertical wipers 80A alternating with three long vertical wipers 80B. In other embodiments, applicator system 110 includes more or fewer vertical wipers 80A, 80B, and in patterns other than the illustrated alternating pattern.

FIGS. 10A and 10B illustrate a tip portion 82 of the vertical wipers 80A, 80B. As illustrated in FIGS. 10A and 10B, each hollow vertical wand 84 includes a hollow opening 88 receiving the viscous material from the reservoir 14. As the viscous material is emitted from the vertical wand 84, it forms dollops 92 which collect on the backing 86, which are then rubbed off or otherwise deposited onto the target. In one exemplary embodiment, the viscous material is continuously emitted from the vertical wand 84 and form a dollop 92 at the end of the tube 84 and on the backing 86 due to its high viscosity. The backing 86 helps to ensure that the dollop 92 remains in place until the next opportunity for contact with the target. The dollop 92 is then transferred to the target by the motion of the vehicle 12 and weight of the backing 86. In the illustrated embodiment, the end portion of vertical wand 84 is partially removed from angled surface 90. In one exemplary embodiment, hollow vertical wands 84 are formed from a flexible material, such as plastic tubing, and backing is formed from a substantially flat, flexible material, such as a fabric. Hollow vertical wands 74A, 74B, 74C are fixed to third portion 42 of the applicator system 110 and dragged over the target via motion of the vehicle 12.

In one exemplary embodiment, applicator system 10 includes one or more optical sensing devices (not shown) to control flow of the material. In one exemplary embodiment, the optical sensing device is operably coupled to the pump 16 and activates the pump 16 to pump material through applicator system 10 only when the optical sensing device senses the presence of an object in a target area. In another exemplary embodiment, the optical sensing device is operably coupled to one or more valves and opens the valve allowing material to flow only when the optical sensing device senses the presence of an object in a target area. In still another exemplary embodiment, one or more optical sensing devices is provided with applicator system 120, wherein a valve controls flow of material through each hollow horizontal wand 78A, 78B, 78C, 78D. In one embodiment, the at least one optical sensing device is operably coupled to each valve such that when the at least one optical sensing device senses the presence of an object at a given height, the valve for the hollow horizontal wand associated with that height is opened.

While this invention has been described as relative to exemplary designs, the present invention may be further modified within the spirit and scope of this disclosure. Further, this application is intended to cover such departures from the present disclosure as come within known or customary practice in the art to which this invention pertains.

I claim:

1. An applicator system for applying a viscous agricultural management material to a targeted area comprising: a frame configured to be attached to a vehicle; a reservoir providing the viscous agricultural management material; and a pump for supplying the viscous agricultural management material from the reservoir to at least one wand; wherein the at least one wand is configured to transport the viscous agricultural management material through an interior of the wand and to collect a quantity of the viscous agricultural management material on an external collection area wherein the viscous agricultural management material is exposed to the environment and the at least one wand is further configured to deposit the quantity of viscous agricultural management material to the targeted area in response to the external collection area being brought into contact with the targeted area; wherein the at least one wand is attached to a disc rotatably coupled to the frame, the rotation of the disc causing the at least one wand to contact the targeted area and deposit the quantity of viscous agricultural management material.

2. The applicator system of claim 1, wherein the at least one wand includes a hollow opening extending through the wand and a distal end including the external collection area, the pump supplying the viscous agricultural management material through the hollow opening to the external collection area.

3. The applicator system of claim 1, further comprising a surface not rotating with the at least one wand, wherein the viscous agricultural management material is provided on the surface, the surface transferring a portion of the viscous agricultural management material to a distal end of the at least one wand including the collection area.

4. The applicator system of claim 1, wherein the frame comprises a first portion coupled to the vehicle, a third portion coupled to the disc, and a second portion pivotably coupled to the first portion and third portion.

5. The applicator system of claim 4 further comprising:

a first adjustment mechanism controlling a first angle between the first portion and second portion; and a second adjustment mechanism controlling a second angle between the second portion and the third portion.

6. The applicator system of claim 1, wherein the frame further includes an interior fluid pathway, the pump supplying the viscous agricultural management material from the reservoir to the external collection area through the interior fluid pathway.

7. The applicator system of claim 6, wherein the frame further includes a fluid pathway supported by the frame, the pump supplying the viscous agricultural management material from the reservoir to the external collection area through the fluid pathway.

8. The applicator system of claim 1, wherein the frame comprises a first portion coupled to the vehicle, a third portion coupled to the disc, and a second portion coupled to the first portion and third portion wherein at least one of the first portion, the second portion, and the third portion includes an adjustable length mechanism controlling a length of the at least one of the first portion, the second portion, and the third portion.

9. The applicator system of claim 1, wherein the at least one wand is coupled to the frame and the at least one wand includes a hollow opening extending through the wand and a distal end including the external collection area, the pump supplying the viscous agricultural management material through the hollow opening to the external collection area.

10. The applicator system of claim 8, wherein the frame comprises a first portion coupled to the vehicle, and a second portion coupled to the at least one wand, the first portion being pivotably coupled to the second portion.

11. The applicator system of claim 10 further comprising:

a first adjustment mechanism controlling a first angle between the first portion and second portion.

12. The applicator system of claim 11, wherein the at least one wand extends substantially horizontally from the second portion.

13. The applicator system of claim 9, wherein the frame comprises a first portion coupled to the vehicle, a third portion coupled to the at least one wand, and a second portion pivotably coupled to the first portion and third portion.

14. The applicator system of claim 13 further comprising:

a first adjustment mechanism controlling a first angle between the first portion and second portion; and a second adjustment mechanism controlling a second angle between the second portion and the third portion.

15. The applicator system of claim 13, wherein the at least one wand extends substantially vertically from the third portion.

16. The applicator system of claim 9, wherein the at least one wand further comprises a backing including the collection area, the viscous agricultural management material being applied to the targeted area by contacting the targeted area with viscous agricultural management positioned on the backing.

* * * * *